US010891431B2

United States Patent
Rakshit et al.

(10) Patent No.: US 10,891,431 B2
(45) Date of Patent: Jan. 12, 2021

(54) POPULATING ELECTRONIC FORM DATA (71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 16/202,159

(22) Filed: Nov. 28, 2018

(65) Prior Publication Data

US 2020/0167412 A1  May 28, 2020

(51) Int. Cl.
| | | |
|---|---|---|
| G06F 3/048 | (2013.01) |
| G06F 40/174 | (2020.01) |
| G06N 20/00 | (2019.01) |
| G06F 3/0488 | (2013.01) |
| H04W 4/80 | (2018.01) |
| G06F 3/01 | (2006.01) |

(52) U.S. Cl.
CPC ............ G06F 40/174 (2020.01); G06F 3/011 (2013.01); G06F 3/048 (2013.01); G06F 3/0488 (2013.01); G06N 20/00 (2019.01); H04W 4/80 (2018.02)

(58) Field of Classification Search
CPC ................... G06F 3/011; G06F 3/048
See application file for complete search history.

(56) References Cited

U.S. PATENT DOCUMENTS

| | | | | |
|---|---|---|---|---|
| 9,336,321 | B1* | 5/2016 | Hayden | G06F 16/9535 |
| 10,244,042 | B2* | 3/2019 | Peiris | G06F 16/243 |
| 2015/0046259 | A1* | 2/2015 | Hicken | G06Q 30/0256 |
| | | | | 705/14.54 |
| 2015/0317295 | A1 | 11/2015 | Sherry et al. | |

(Continued)

OTHER PUBLICATIONS

Kuusik et al., "SMARTMUSEUM: Cultural Content Recommendation System for Mobile Users," 2009 Fourth International Conference on Computer Sciences and Convergence Information Technology, p. 477-482. (Year: 2009).*

(Continued)

*Primary Examiner* — Amelia L Tapp
(74) *Attorney, Agent, or Firm* — Garg Law Firm, PLLC; Rakesh Garg; Brian Restauro (57) ABSTRACT

Populating user data into an electronic form includes a first device receiving cell information indicative of a touch input by a user to a selected cell of an electronic form within a display of a second device using a first human-body near-field communication from the second device to the first device. An information repository associated with the user is searched for user data associated with the selected cell based upon the cell information. The first device receives one or more search results from the information repository. The first device sends the one or more search results to the second device using a second human-body near-field communication from the first device to the second device. The first device is configured to populate the selected cell with user data based upon the one or more search results.

20 Claims, 5 Drawing Sheets

(56) References Cited

U.S. PATENT DOCUMENTS

| | | | |
|---|---|---|---|
| 2016/0034543 A1* | 2/2016 | Nagar | G06F 16/9032 |
| | | | 707/748 |
| 2016/0148193 A1 | 5/2016 | Kelley et al. | |
| 2017/0075873 A1* | 3/2017 | Shetty | G06F 3/0481 |
| 2017/0147550 A1 | 5/2017 | Wetzel et al. | |
| 2017/0262421 A1 | 9/2017 | Yue | |
| 2017/0332908 A1 | 11/2017 | Uno | |

OTHER PUBLICATIONS

Yusuf Perwej, A Literature Review of the Human Body as a Communication Medium Using RedTacton, Apr. 2016.

* cited by examiner

POPULATING ELECTRONIC FORM DATA

TECHNICAL FIELD

The present invention relates generally to a method, system, and computer program product for populating electronic form data. More particularly, the present invention relates to a method, system, and computer program product for populating electronic form data using human-body near-field communication.

BACKGROUND

Near-field communication (NFC) is a device communication technology that allows devices to communicate with one another by bringing the devices within close proximity with one another. NFC utilizes short-range wireless technologies to pair devices together, establish a connection between the devices, and exchange data between the devices. Typically, NFC-enabled devices utilize electromagnetic induction between antennas in each device to communicate using NFC protocols. NFC is often used for applications such as interacting with contactless payment systems and sharing contacts and other files between devices.

SUMMARY

The illustrative embodiments provide a method, system, and computer program product. An embodiment includes receiving, by a first device, cell information indicative of a touch input by a user to a selected cell of an electronic form within a display of a second device using a first human-body near-field communication from the second device to the first device. The embodiment further includes searching an information repository associated with the user for user data associated with the selected cell based upon the cell information. The embodiment further includes receiving, by the first device, one or more search results from the information repository. The embodiment still further includes sending, by the first device, the one or more search results to the second device using a second human-body near-field communication from the first device to the second device. In the embodiment, the first device is configured to populate the selected cell with user data based upon the one or more search results.

Another embodiment further includes determining that the one or more search results include a plurality of search results, each search result including user data associated with the selected cell, and sending, by the first device, a request to the second device to prompt the user to select a first search result from among the plurality of search results.

In another embodiment, the second device is configured to receive a selection of the first search result from among the plurality of search results, and populate the selected cell with user data of the first search result.

Another embodiment further includes determining that the one or more search results do not include user data associated with the selected cell, and sending, by the first device, a request to the second device to prompt the user to manually enter user data into the selected cell. In another embodiment, the second device is configured to receive user data from the user, and populate the selected cell with the user data.

In another embodiment, the cell information includes one or more of display coordinates of the cell or a cell identifier associated with the cell. In another embodiment, the cell identifier is indicative of a type of user data required by the cell. In another embodiment, the display coordinates are mapped to a type of user data required by the cell.

Another embodiment further includes training a machine-learning algorithm using the populated data, and updating the information repository based upon the training for a particular form type.

In another embodiment, the first device is a smart device. In another embodiment, the first device is a wearable device associated with the user.

In another embodiment, the information repository is stored in at least one of the first device or the second device. In another embodiment, the information repository is located at a remote server.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein are directed to populating electronic form data using human-body near-field communication. Embodiments recognize that many use cases exist in which a user is required to complete online or offline forms using a display of a device. Embodiments recognize that many existing solutions utilize a keyboard to allow a user to type appropriate content in the form or use applications to retrieve and fill-in content in the forms. The forms often include common attributes about the user such a name, a home address, a telephone number, a date of birth, user feedback or other user information. If the user needs to fill some predefined contents then the user often needs to type using a keyboard or enter an external application.

One or more embodiments provide for a body-area network utilizing near-field communication (NFC) that uses the human body as a communication path between devices as an alternative to other communication technologies such as Bluetooth™. With human-body NFC, a signal is generated by a transmitter in an NFC-enabled electronic device in contact with a portion of the human body and the human body carries an electric-field signal travels through the human body to communicate data such as a command to a receiver of another NFC-enabled device in contact with another portion of the human body.

Various embodiments provide for a method and system for users to securely transmit and populate data into electronic forms automatically by the user touching one or more desired cells of an electronic form displayed by a user device using human-body near-field communication between the user touch device and a smart device associated with the user. In a particular embodiment, the smart device includes a smartwatch worn by the user. In one or more embodiments, cell information associated with the touched cell, such as coordinates of the cell within the display of the user touch device and a cell identifier (e.g., name) associated with the cell, is transmitted from the user touch device to the user's smart device. In a particular embodiment, the cell identifier includes information indicative of a type of user data required by the cell. In another particular embodiment, the coordinates of the cell are mapped to a type of user data required by the cell. In one or more embodiments, the smart devices performs a search in a user information repository associated with the user located in one or more of the user touch device, the user's smart device, or a network server (e.g., a cloud-based server) using the cell information for user data required to populate the cell. In one or more embodiments, search result data obtained from the search of the specific cell is returned to the user's smart device, and then transmitted using secure human-body near-field communication to the user touch device. In the embodiment, the user touch device inserts the result data into the cell of the electronic form to populate the electronic form.

In one or more embodiments, in cases in which more than one search result is identified from the search of the user information repository leading to an ambiguity in the cell, the smart device instructs the user touch device to display the multiple search results in the electronic form and prompt the user to select the desired result. In a particular embodiment, the user touch device displays a pop-up display in the electronic form to allow the user to select the desired result. In one or more embodiments, in cases in which no information is found during the search of the user information repository, the user touch device presents the user with a virtual keyboard allow the user to update the cell with the correct information. In one or more embodiments, the user touch device sends the updated cell information to the smart device, and the smart device adds a new key pair to the user information repository.

In one or more embodiments, the system learns key pairs over time that are common to a specific user from manual entries and from other data sources such as social networking using machine-learning, and populates the user information repository associated with the user with the key pairs. In one or more embodiments, a key pair includes an identity of a particular cell of an electronic form and a value for the cell.

An embodiment can be implemented as a software application. The application implementing an embodiment can be configured as a modification of an existing system or platform, as a separate application that operates in conjunction with an existing system or platform, a standalone application, or some combination thereof.

The illustrative embodiments are described with respect to certain types of user devices, smart devices, electronic form data applications, social networking sources, tools and platforms, searching procedures and algorithms, NFC communication procedures, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
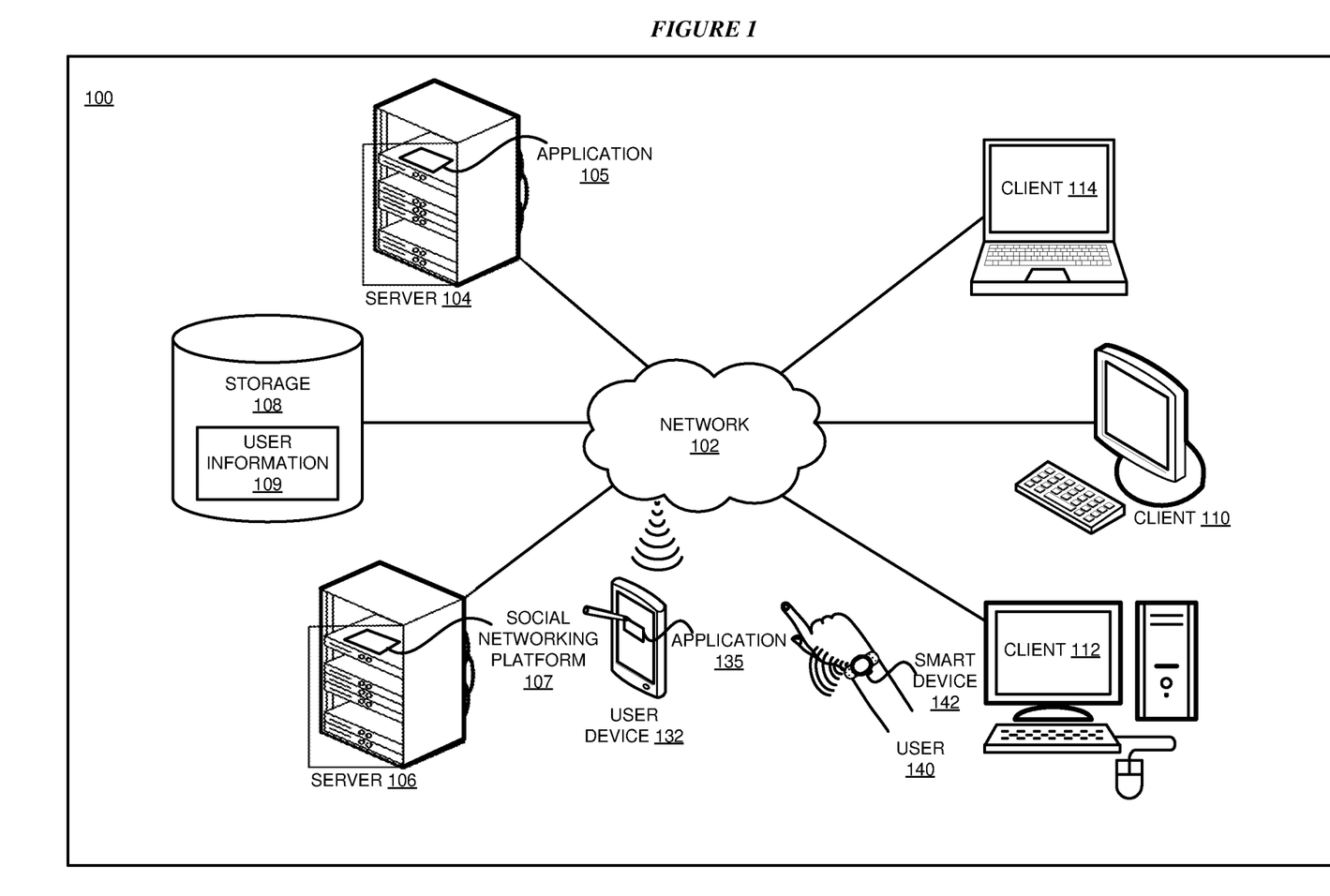
FIG. 1 depicts a block diagram of a network of data processing systems in which illustrative embodiments may be implemented.
Figure 2:
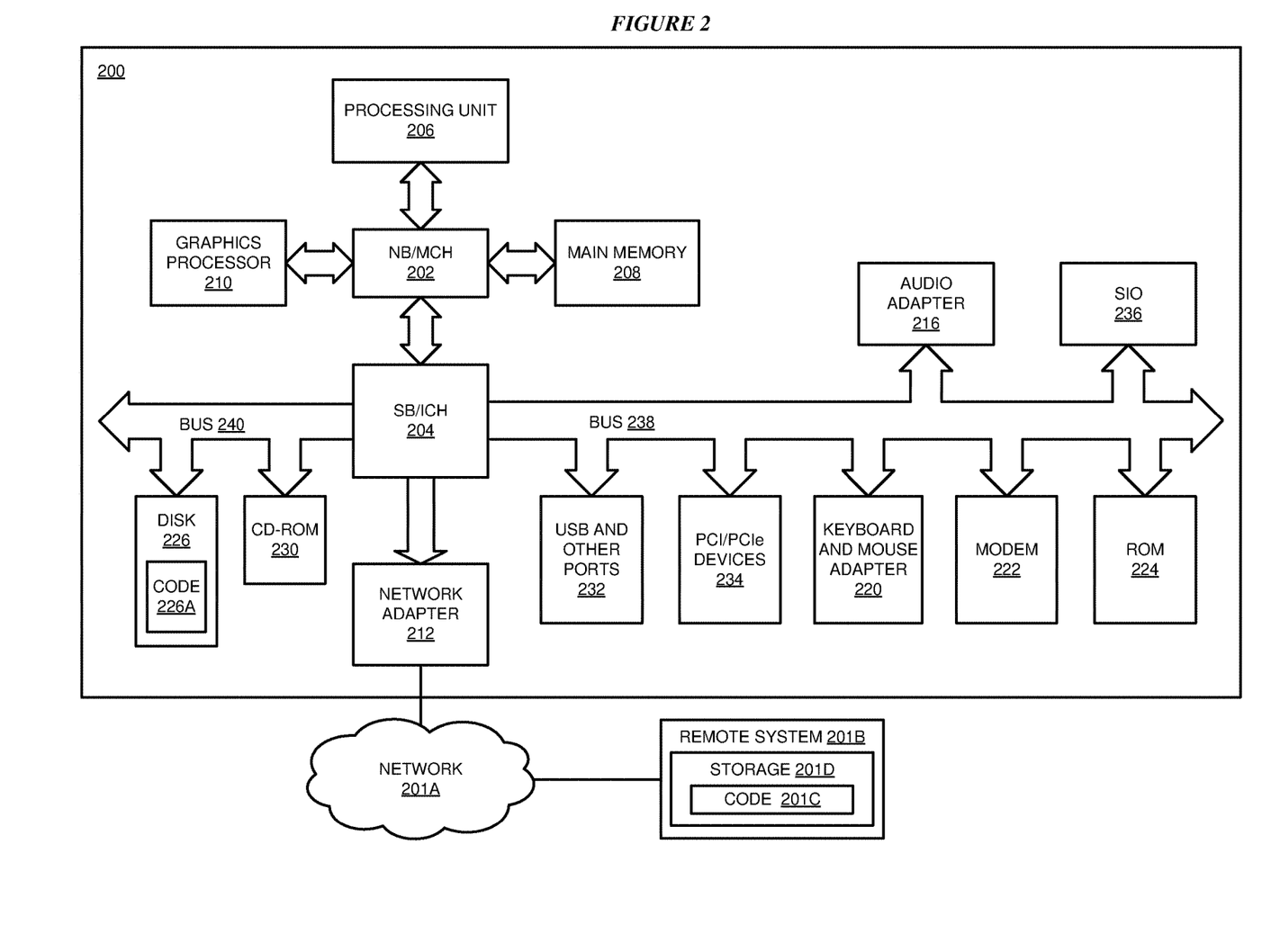
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

User device 132 is an example of a user touch device described herein. For example, device 132 can take the form of a smartphone, a tablet computer, a laptop computer, client 110 in a stationary or a portable form, a wearable computing device, or any other suitable device. In an embodiment, user device 132 is associated with a user 140 who desires to fill-out one or more cells associated with an electronic form displayed by user device 132. User device 132 includes an application 135 configured to perform the respective operations of the user devices described herein such as displaying an electronic form including one or more cells to user 140, receiving a touch input from user 140 at the one or more cells, and communicating with another device using human-body NFC. Smart device 142 is in contact with and/or worn by user 140 and is configured to perform the respective operations of the smart devices described herein such as communicating with user device 132 using human-body NFC, search a user information repository for user data to populate the one or more cells, and providing the user data to user device 132 to populate the one or more cells. For example, smart device 142 can take the form of a smartwatch, a wearable computing device, or any other suitable device. Any software application described as executing in another data processing system in FIG. 1 can be configured to execute in user device 132 and/or smart device 142 in a similar manner. Any data or information stored or produced in another data processing system in FIG. 1 can be configured to be stored or produced in user device 132 and/or smart device 142 in a similar manner.

Servers 104 and 106, storage unit 108, and clients 110, 112, and 114, user device 132 and smart device 142 may be coupled to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for populating electronic form data using human-body near-field communication in accordance with one or more embodiments such as searching for data to populate the one or more forms and/or implementing machine-learning algorithms to update key pair data. Server 106 includes a social networking platform 107 to facilitate providing of data from one or more social media sources associated with the user to populate the one or more cells of the electronic form as described herein with respect to various embodiments. In one or more embodiments, one or more of application 105 shown as executing in server 104 or social networking platform 107 shown as executing in server 106 may instead by executed within one or more of user device 132 or smart device 142 in a similar manner.

Storage device 108 includes a user information repository 109 configured to store a corpus of data associated with user 140 for filling-in the one or more cells of the electronic form displayed by user device 132 as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
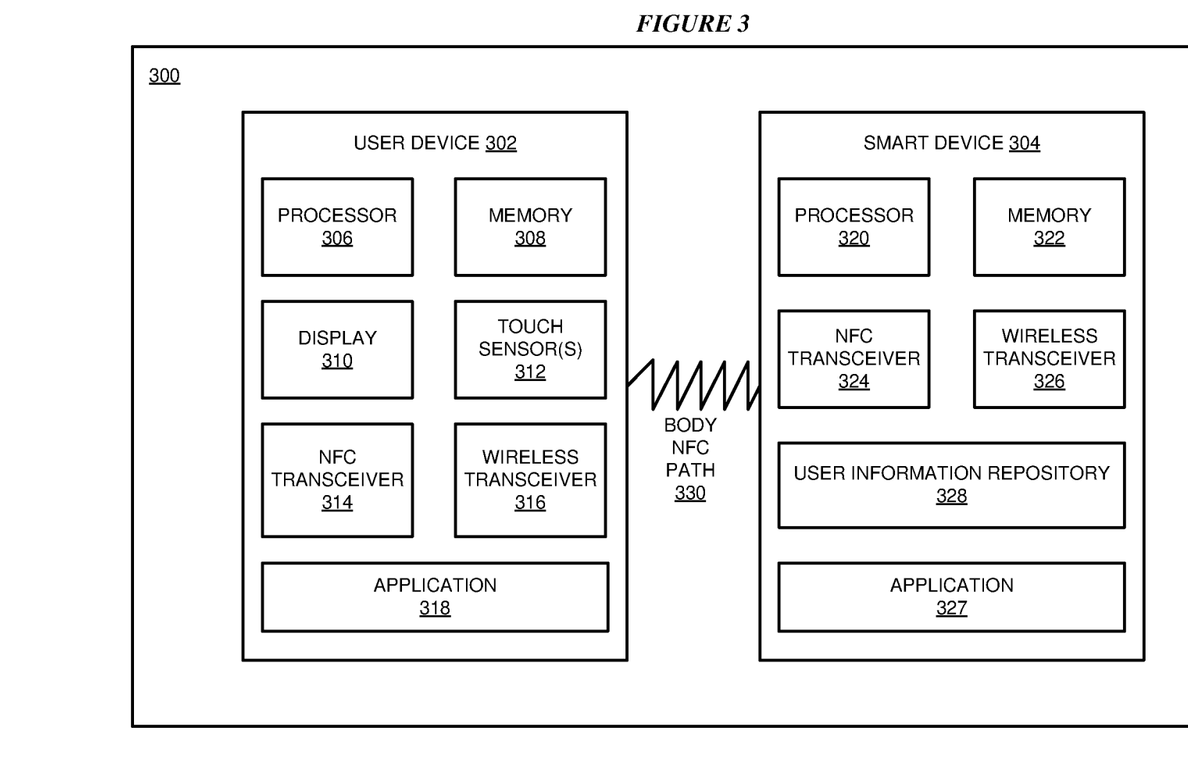
FIG. 3 depicts a block diagram of an example configuration of a user device and a smart device for populating electronic form data using human-body near-field communication in accordance with an illustrative embodiment.

With reference to FIG. 3, this figure depicts a block diagram of an example configuration 300 of a user device 302 and a smart device 304 for populating electronic form data using human-body near-field communication in accordance with an illustrative embodiment. User device 302 is an example of user device 132 of FIG. 1 and smart device 304 is an example of smart device 142 of FIG. 1. User device 302 includes a processor 306, a memory 308, a display 310, one or more touch sensors 312, an NFC transceiver 314, a wireless transceiver 316, and an application 318.

Processor 306 is configured to retrieve instructions from memory 308 and execute the instructions to perform various operations of user device 302 as described herein. In one or more embodiments, display 310 is configured to present an electronic form including one or more cells to a user of user device 302. In one or more embodiments, touch sensor(s) 312 is configured to identify a touch from a user of a location and one or more cells of the electronic form displayed on display 310 such as during selection of the one or more cells as described herein with respect to one or more embodiments.

NFC transceiver 314 is configured to allow user device 302 to transmit and received NFC signals with smart device 304 as further described herein. Wireless transceiver 316 is configured to allow user device 302 to transmit and receive wireless signals such as mobile data with one or more wireless networks.

Application 318 is configured to perform one or more functions of user device 302 for populating electronic form data using human-body near-field communication in accordance one or more embodiments as described herein. In one or more embodiments, application 318 is configured to transmit cell information associated with a selected cell of an electronic form from user device 302 to smart device 304 using human-body near-field communication, and receive search result data to populate the selected cell, and update the selected cell of the electronic form using the search result data. In a particular embodiment, application 318 is configured to receive the search result data from smart device 304.

In an embodiment, application 318 is configured to display a pop-up in the electronic form to display multiple search results for the same cell in response to an ambiguity arising from the multiple search results, and allow the user to select a particular one of the search results to populate the cell of the electronic form. In an embodiment, application 318 is configured to display a virtual keyboard for a user to enter text or other data to populate a cell in response to no suitable search results being received and/or to update data in the user information repository associated with the user. Application 318 is an example of application 135 of FIG. 1.

Smart device 304 includes a processor 320, a memory 322, an NFC transceiver 324, a wireless transceiver 326, an application 327, and a user information repository 328. Processor 320 is configured to retrieve instructions from memory 322 and execute the instructions to perform various operations of smart device 304 as described herein.

NFC transceiver 324 is configured to smart device 304 to transmit and received NFC signals with user device 302 as further described herein. Wireless transceiver 326 is configured to allow smart device 304 to transmit and receive wireless signals such as mobile data with one or more wireless networks.

Application 327 is configured to perform one or more functions of smart device 304 for populating electronic form data using human-body near-field communication in accordance one or more embodiments as described herein. In one or more embodiments, application 327 is configured to receive cell information associated with a cell of an electronic form from user device 302 responsive to a user touching the cell, initiate a search of user information repository 328, receive search results from the search, and provide the search results, if any, to user device 302 for populating the cell of the electronic form.

In one or more embodiments, user information repository 328 stores information associated with the user such as the user's name, address, telephone number, or date of birth usable to fill-in a cell of an electronic form. In one or more embodiments, user information repository 328 stores one or more key pairs in which each key pair includes an identity of a particular cell of an electronic form and a value for the cell. In the embodiment illustrated in FIG. 3, user information repository 328 is stored in memory of smart device 304. In an alternative embodiment, user information repository 328 is stored in a network server, such as a remote cloud server, and smart device 304 communicates with the server using a Wi-Fi, 3G/4G, or another suitable network communication medium. In one or more embodiments, smart device 304 communicates with user device 302 using a human-body NFC path 330.

Figure 4:
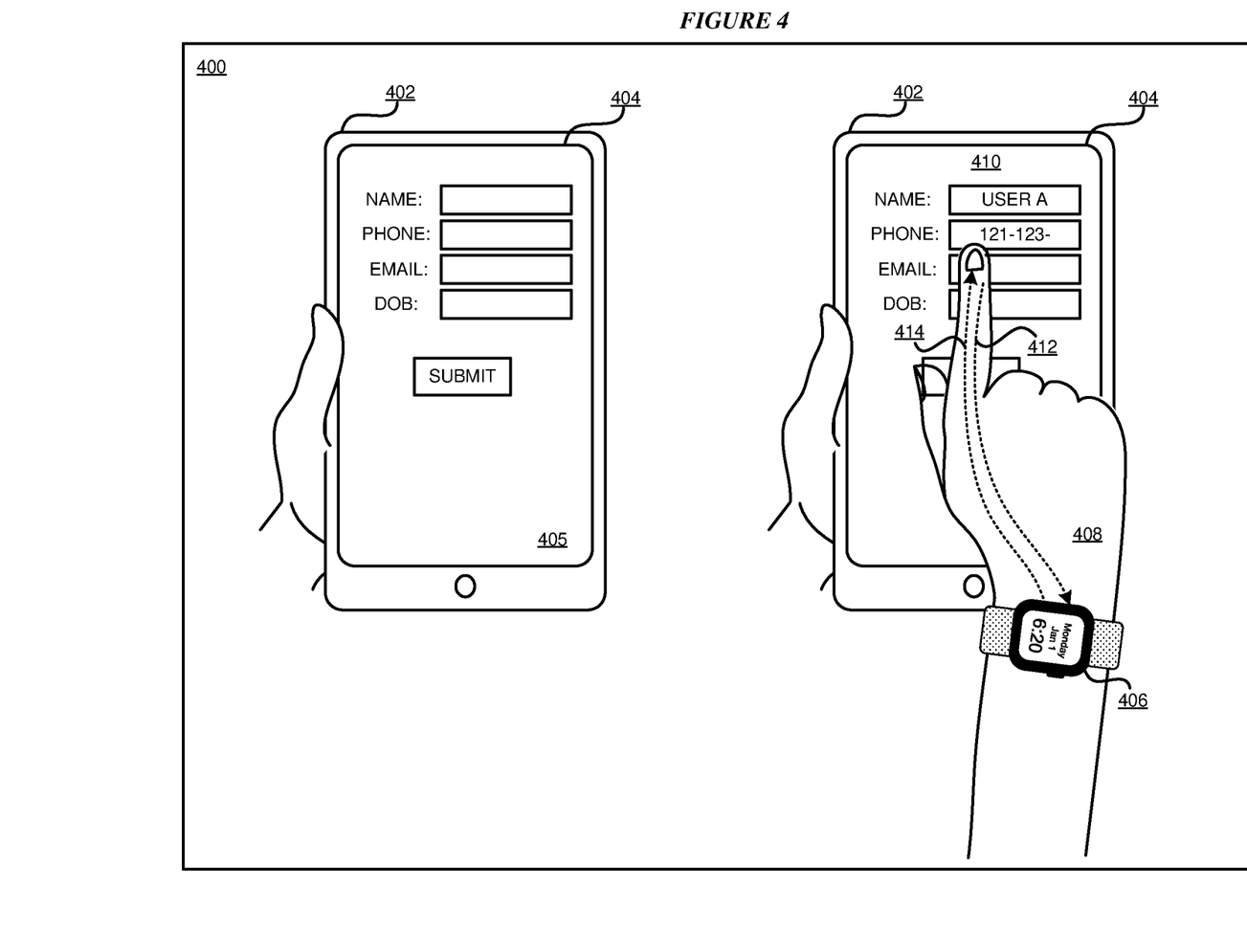
FIG. 4 depicts an example scenario for populating electronic form data using human-body near-field communication in accordance with an illustrative embodiment.

With reference to FIG. 4, this figure depicts an example scenario for populating electronic form data using human-body near-field communication in accordance with an illustrative embodiment. FIG. 4 depicts a user of a user device 402 including a display 404 attempting to fill one or more cells of an electronic form 405, such as a web form, by performing a touch gesture on a selected cell of electronic form 405 using a finger of a hand 408 of the user. In the embodiment illustrated in FIG. 4, electronic form 405 includes a name cell, a phone number cell, an email cell, and a date of birth (DOB) cell, and the user touches the phone number cell of electronic form 405.

In an embodiment, user device 402 sends metadata of the selected cell (e.g., cell information such as a cell location and/or a cell identifier) as a search query or request to a smart device 406 worn on a wrist of the user using a human-body near-field communication path 412 extending from the finger of the user to the wrist of the user. In the embodiment, user device 402 automatically updates the selected cell of electronic form 405 using one or more cell values indicated in the search results. In one or more embodiments, user device 402 is an example of user device 132 of FIG. 1 and smart device 406 is an example of smart device 142 of FIG. 1.

In the illustrated example, the selected cell is a phone number cell and the search query is for a phone number associated with the user. In a particular embodiment, smart device 408 is a smartwatch. In an embodiment, smart device 408 searches a user information repository associated with the user located on one or more of user device 402, smart device 408, or a remote server for user information corresponding to the selected cell. In the embodiment, smart device 408 receives one or more search results from the user information repository and sends the identified search results to user device 402 using human-body near-field communication path 414 extending from the wrist of the user to the finger of the user.

Figure 5:
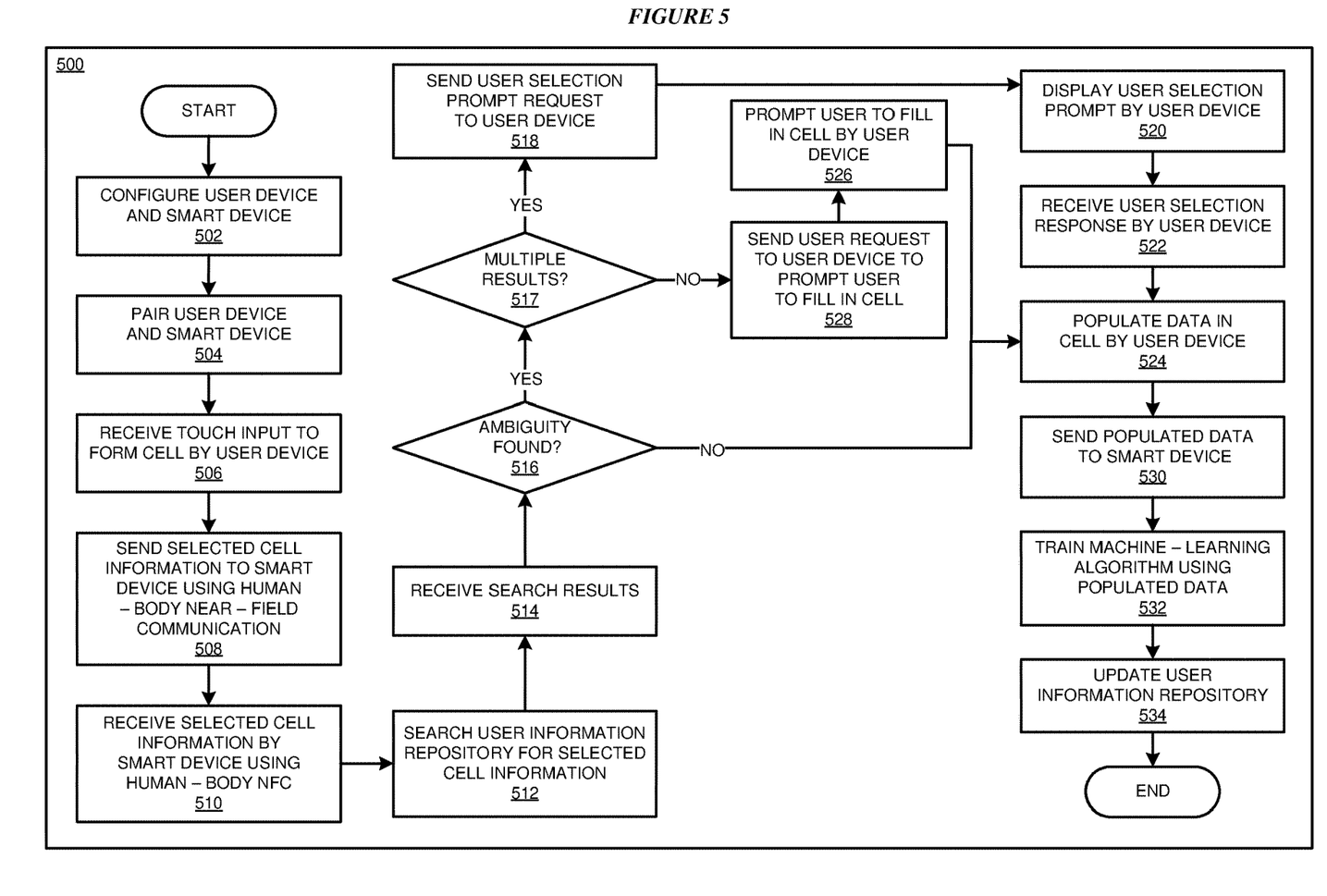
FIG. 5 depicts a flowchart of an example process for populating electronic form data using human-body near-field communication in accordance with an illustrative embodiment.

With reference to FIG. 5, this figure depicts a flowchart of an example process 500 for populating electronic form data using human-body near-field communication in accordance with an illustrative embodiment. In block 502, user device 132 and smart device 142 are configured to communicate with one another using human-body near field communication and facilitate the populating of electronic form data. In one or more embodiments, the configuration may further include installation of one or more applications on user device 132 and smart device 142. In a particular embodiment, the configuration may further include configuring one or more of user device 132 and smart device 142 with a network address of a server associated with user information repository 109. In block 504, user device 132 and smart device 142 are paired together for human-body near-field communication.

In block 506, user device 132 receives a touch input from a user to a selected cell of an electronic form displayed by user device 132. In a particular embodiment, the user selects the cell while filling out a web form on user device 132. In block 508, user device 132 sends cell information or metadata of the selected cell to smart device 142 using human-body near-field communication. In one or more embodiments, the cell information is determined based upon a location of the touch input on the display of user device 132 and includes information such as display coordinates of the cell, a cell identifier associated with the cell, and any other required information. In an alternative embodiment, a user may perform a gesture on a specific cell while filling out an electronic form without actually touching the display to select the cell of the electronic form. In a particular embodiment, user device 132 or smart device 142 may include a camera, or smart device 142 may include a sensor to determine a cell intended to be selected by the user.

In block 508, user device 142 sends the selected cell information to smart device 142 using human-body near-field communication. In block 510, smart device 142 receives the selected cell information using the human-body near-field communication. In block 512, smart device 142 initiates a search of a user information repository associated with the user, such as user information repository 109, for the user information required to fill the selected cell in the electronic form. In particular embodiments, the user information repository may be located on one or more of user device 132, smart device 142, or a remote cloud based server.

In block 514, smart device 142 receives one or more search results of the search of the user information repository including user information associated with the selected cell and sends the one or more search results to user device 132 using human-body near-field communication. In one or more embodiments, the human-body near-field communication utilizes a secure connection for communication between user device 132 and smart device 142. In an example, a selected cell is a Name cell requesting a name of the user and the search results from the user repository includes a name of "John Doe" associated with the user.

In block 516, smart device 142 determines whether any ambiguity is found in the search results. In one or more embodiments, an ambiguity may result if more than one search result is found in the search results for a selected cell such as multiple names or multiple phone numbers associated with a user. In one or more embodiments, an ambiguity may also result if no search results are returned in response to the search request.

If an ambiguity is found, in block 517, smart device 142 determines whether multiple search results have been returned. If smart device 142 determines that multiple search results have been returned, in block 518 smart device 142 sends a user selection prompt request to user device 132. In particular embodiments, smart device 142 sends the user selection prompt request to user device 132 using human-body near-field communication. In block 520, user device 132 displays a user selection prompt to the user displaying each of the multiple search results and prompting the user to select one of the multiple search results. For example, for a name cell, search results may include the names "John Doe", "John M Doe", or "John M. Doe Jr." and the user may select one of the names for populating of the name cell. In another example, the search results for a phone number cell may include multiple phone numbers associated with the user including a home phone, a mobile phone, and a work phone, and the user may select one of the phone numbers for populating the phone number cell. In block 522, user device 132 receives a user selection response from the user indicating the selected search result.

In block 524, user device 132 populates data in the selected cell using the selected search result. If smart device 142 determines in block 516 that no ambiguity is found in the search results, the process also proceeds to block 524 in which user device 132 populates data in the data for the selected cell using the single search result.

If smart device determines in block 517, that multiple results were not returned indicative that no results were found, smart device 142 sends a request to user device 132 to prompt the user to fill-in the user information data of the selected cell manually and process 500 continues to block 528. In block 528, user device 132 prompts the user to fill-in the data in the selected call manually. In a particular embodiment, user device 132 displays a virtual keyboard to allow the user to fill-in the data of the selected cell and process 500 also proceeds to block 524 in which the user device 132 populates data in the selected cell using the manually-entered data. After block 524, process 500 continues to block 530.

In block 530, user device 132 sends an indication of the populated data to smart device 142. In block 532, smart device 142 trains a machine-learning algorithm using the populated data to allow smart device 142 to learn various user information types for electronic form cells. In a particular embodiment, the machine-learning algorithm includes natural language processing. In another particular embodiment, the machine-learning algorithm includes a neural network. In block 524, smart device 142 updates the user information repository based upon the training using the populated data for a particular form type. In a particular embodiment, smart device 142 updates the user information repository by creating new entries in the user information repository including the newly learned data for the particular form type. For example, some forms are very specific and require a First Name, a Middle Name, a Last Name, etc. Other forms may, such as a name for a credit card need a proper name associated with the card but do not enforce strict entry. In particular embodiments, the system may learn the proper name on the credit card for the particular credit card using machine learning and associating the name with the credit card from a previous ambiguity selection of the name by the user.

In one or more embodiments, social networking information received from a social networking platform, such as social networking platform 107 is also used to populate data in the user information repository associated with the user. For example, the social network information may include a name, address, phone number, or other information associated with the user that may be usable to populate an electronic form. Process 500 then ends.

Thus, a computer implemented method, system or apparatus, and computer program product are provided in the illustrative embodiments for populating electronic form data using human-body near-field communication and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, by a first device, metadata of a selected cell as a search request, the metadata comprising an indication of a type of user data required by the selected cell,
   wherein the search request is received responsive to a touch input by a user to the selected cell of an electronic form within a display of a second device, and
   wherein the search request is received by the first device using a first human-body near-field communication from the second device to the first device;
   searching an information repository associated with the user for the type of user data required by the selected cell;
   receiving, by the first device, one or more search results from the information repository; and
   sending, by the first device, the one or more search results to the second device using a second human-body near-field communication from the first device to the second device, the second device operable to populate the selected cell with user data based upon the one or more search results.

2. The computer-implemented method of claim 1, further comprising:
   determining that the one or more search results include a plurality of search results, each search result including user data associated with the selected cell; and
   sending, by the first device, a request to the second device to prompt the user to select a first search result from among the plurality of search results.

3. The computer-implemented method of claim 2, wherein the second device is operable to receive a selection of the first search result from among the plurality of search results, and populate the selected cell with user data of the first search result.

4. The computer-implemented method of claim 1, further comprising:
   determining that the one or more search results do not include user data associated with the selected cell; and
   sending, by the first device, a request to the second device to prompt the user to manually enter user data into the selected cell.

5. The computer-implemented method of claim 4, wherein the second device is operable to receive user data from the user, and populate the selected cell with the user data.

6. The computer-implemented method of claim 1, wherein the metadata includes one or more of display coordinates of the selected cell or a cell identifier associated with the selected cell.

7. The computer-implemented method of claim 6, wherein the cell identifier is indicative of the type of user data required by the selected cell.

8. The computer-implemented method of claim 6, wherein the display coordinates are mapped to the type of user data required by the selected cell.

9. The computer-implemented method of claim 1, further comprising:
   training a machine-learning algorithm using the populated data; and
   updating the information repository based upon the training for a particular form type.

10. The computer-implemented method of claim 1, wherein the first device is a smart device.

11. The computer-implemented method of claim 1, wherein the first device is a wearable device associated with the user.

12. The computer-implemented method of claim 1, wherein the information repository is stored in at least one of the first device or the second device.

13. The computer-implemented method of claim 1, wherein the information repository is located at a remote server.

14. A computer usable program product comprising one or more computer-readable storage devices, and program instructions stored on at least one of the one or more storage devices, the stored program instructions comprising:
   program instructions to receive, by a first device, metadata of a selected cell as a search request, the metadata comprising an indication of a type of user data required by the selected cell,
   wherein the search request is received responsive to a touch input by a user to the selected cell of an electronic form within a display of a second device, and
   wherein the search request is received by the first device using a first human-body near-field communication from the second device to the first device;
   program instructions to search an information repository associated with the user for the type of user data required by the selected cell;
   program instructions to receive, by the first device, one or more search results from the information repository; and
   program instructions to send, by the first device, the one or more search results to the second device using a second human-body near-field communication from the first device to the second device, the second device operable to populate the selected cell with user data based upon the one or more search results.

15. The computer usable program product of claim 14, further comprising:
   program instructions to determine that the one or more search results include a plurality of search results, each search result including user data associated with the selected cell; and
   program instructions to send, by the first device, a request to the second device to prompt the user to select a first search result from among the plurality of search results.

16. The computer usable program product of claim 15, wherein the second device is operable to receive a selection of the first search result from among the plurality of search results, and populate the selected cell with user data of the first search result.

17. The computer usable program product of claim 14, further comprising:
   program instructions to determine that the one or more search results do not include user data associated with the selected cell; and program instructions to send, by the first device, a request to the second device to prompt the user to manually enter user data into the selected cell.

18. The computer usable program product of claim 14, wherein the program instructions are stored in a computer readable storage device in a data processing system, and wherein the program instructions are transferred over a network from a remote data processing system.

19. The computer usable program product of claim 14, wherein the program instructions are stored in a computer readable storage device in a server data processing system, and wherein the program instructions are downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive, by a first device, metadata of a selected cell as a search request, the metadata comprising an indication of a type of user data required by the selected cell, wherein the search request is received responsive to a touch input by a user to the selected cell of an electronic form within a display of a second device, and wherein the search request is received by the first device using a first human-body near-field communication from the second device to the first device;

program instructions to search an information repository associated with the user for the type of user data required by the selected cell;

program instructions to receive, by the first device, one or more search results from the information repository; and program instructions to send, by the first device, the one or more search results to the second device using a second human-body near-field communication from the first device to the second device, the second device operable to populate the selected cell with user data based upon the one or more search results.

\* \* \* \* \*